United States Patent Office 2,763,528
Patented Sept. 18, 1956

2,763,528

PROCESS FOR DYEING LEATHER WITH ACID AND DIRECT DYES

Jules Meyer and Max Schwank, Basel, and Otto Albrecht, Neuewelt, near Basel, Switzerland, assignors to Ciba Limited, Basel, Switzerland, a Swiss firm No Drawing. Application December 18, 1951,
Serial No. 262,332

Claims priority, application Switzerland
December 29, 1950

7 Claims. (Cl. 8—12)

It is known that leather which has been treated with chromium salts, either with a chromium salt alone or in conjunction with another tanning agent must be made capable of being wetted by water before it is dyed, if the leather has been dried after the tanning process. In order to make the leather wettable it is usual to use a wetting agent. For this purpose various types of wetting agents are used, but they have certain disadvantages. Various useful wetting agents may lead to a disadvantageous lightening of the dyeing subsequently produced, and the use of other wetting agents may impart to the leather an undesirable fatty appearance. Leather treated with certain wetting agents has the disadvantage that in dyeing the leather on one side the dyestuff strikes through, that is to say, the other side of the leather becomes partially dyed. In this way speckled non-uniform dyeings may result.

The present invention is based on the unexpected observation that leather, which has been tanned with a chromium salt alone or in conjunction with another tanning agent free from phenolic hydroxyl groups, can be dyed with advantage by treating leather before or during dyeing with a reaction product of at least 4 molecular proportions of an $\alpha:\beta$-alkylene oxide with one molecular proportion of an organic compound containing at least one basic, primary or secondary amino group or one which contains a basic tertiary amino group and in addition an alcoholic hydroxyl group, or a salt derived from such compound.

As starting materials for making the reaction products used in the process there come into consideration $\alpha:\beta$-alkylene oxides, such as ethylene oxide, propylene oxide or glycide. Especially valuable products are obtained by starting from ethylene oxide.

As organic compounds containing at least one basic, primary or secondary amino group or a basic tertiary amino group and in addition an alcoholic hydroxyl group, there may be used amines of the aliphatic, aromatic or alicyclic series. Among those of the aliphatic series there may be mentioned, monamines, for example, methylamine, ethylamine, diethylamine, butylamine, hexylamine, dodecylamine, cetylamine, oleylamine and octadecylamine; and polyamines such as ethylenediamine or triethylene tetramine. There may also be used basic derivatives of such amines, for example, esters of hydroxyamines with higher fatty acids, for example, the triethanolamine ester of the fatty acids of coconut oil, or partial amides of polyamines with fatty acids, for example, triethylene tetramine monoacylated with coconut oil fatty acids. Among the amines of the aromatic series there come into consideration above all amines of the benzene or naphthalene series having alkyl side chains containing, for example, 8–18 carbon atoms. Among those of the alicyclic series there are advantageously used resin amines such as abietylamine, abietyl-methylamine, the corresponding amine mixture from tall oil which contains resin amines in addition to higher alkylamines, or hydrogenated abietylamine.

For use in the process of the invention there are suitable products obtainable by the reaction of one molecular proportion of an amine with at least 4, for example, 4–50, molecular proportions of an alkylene oxide, for example, the reaction product of one molecular proportion of dodecylamine with about 6 molecular proportions of ethylene oxide, or from one molecular proportion of oleylamine with 6, 8 or 16 molecular proportions of ethylene oxide, or of one molecular proportion of stearylamine with 8 or 16 molecular proportions of ethylene oxide. The condensation products from one molecular proportion of a resin amine with 10 molecular proportions of ethylene oxide are also very suitable for the process.

The condensation products are made by methods customary for making such products. They can be made, for example, by reacting the components with heat. It is of advantage not to add the whole of the alkylene oxide to the amine in one portion, but to add it gradually, for example, by adding it to or introducing it into the aminocompound in the gaseous or liquid state at a temperature at which the reaction with alkylene oxide occurs, for example, at 50–200° C. If desired, the reaction may be carried out in a closed vessel under pressure, advantageously at 2–10 atmospheres gauge pressure. A catalyst may be added to the reaction mixture if necessary. As catalysts there come into consideration preferably substances of alkaline reaction, such as metallic sodium, alkali hydroxides, alkali carbonates or alkali salts of carboxylic acids of low molecular weight.

The condensation products used in the process of the invention are either soluble in water or easily dispersible therein. The solubility in water may, if desired, be increased by simple salt formation by introducing groups enhancing solubility in water. Thus, for example, quaternary ammonium salts may be used, which contain alkylene glycol chains derived from $\alpha:\beta$-alkylene oxides and are obtained, for example, by the additive combination of an alkylating agent with the reaction product of the primary, secondary or tertiary amine of the aforementioned kind with the alkylene oxide. There may be mentioned quaternary ammonium salts formed by quaternating with dimethyl sulfate the reaction product of oleylamine with 6–10 molecular proportions of ethylene oxide. Instead of the reaction products of alkylene oxides with primary, secondary or tertiary amines of the aforementioned kind there may be used products which are obtained by introducing into the amines polyglycol ether chains having a corresponding number of ether groups.

In dyeing tanned leather in accordance with the process of the invention solutions or dispersions of the condensation product are used. Instead of a single condensation product there may be used a mixture of several such products. The condensation products may be applied before or during the dyeing process. When the treatment is carried out before dyeing, the solutions or dispersions may be used together with other substances which are customarily employed for fat-liquoring or drumming leather. When the treatment with the condensation products is carried out simultaneously with the fat-liquoring, the sulfonated oils used for fat-liquoring and the condensation product may be dissolved or dispersed in the same liquor. In this case the treatment of the leather is advantageously carried out at a raised temperature, for example, 40–60° C. The treatment may be carried out in a vat, but it is also possible to carry out the fat-liquoring with a brush or by hand. In another form of the process the chrome-tanned leather is fat-liquored with a sulfonated oil without previous drying and subsequently subjected to the treatment with the condensation product. In this case the fat-liquoring and the subsequent treatment may be carried out at the same, advantageously a raised, temperature or the fat-liquoring may be carried out at a raised temperature and the subsequent treatment at ordinary temperature. The condensation product may be dissolved in the fat-liquoring bath used. Alternatively the treatment with the condensation product may be carried out in a fresh bath.

Another way of applying the condensation product is in conjunction with the wetting back of the leather. The drumming liquor may contain in addition to the condensation product other substances usually added, for example, ammonia. The drumming may be carried out at ordinary or a raised temperature, and advantageously in a vat.

When the condensation product is applied before dyeing, it may be applied independently of the time at which dyeing is carried out or immediately preceding the dyeing. The leather may be dried, for example, after the treatment and fatting. In the subsequent dyeing operation the dyestuff is taken up uniformly and with a full tint.

The desired products may also be added to the water with which the leather is drummed before dyeing, and the leather so wetted dyed immediately thereafter. When the condensation products are applied during dyeing, they are dissolved or dispersed in the dye liquor, the dyeing may be carried out in the usual manner either by brushing or in a dye vat.

There may be used any desired leather, which has been tanned with chromium salts alone or in conjunction with other tanning agents free from phenolic hydroxyl groups. As tanning agents free from phenolic hydroxyl groups and other than chromium salts there may be mentioned, aluminium salts, zirconium salts and certain synthetic tanning agents.

Especially handsome dyeings are produced by using the condensation products according to this invention in conjunction with acid and direct dyeing leather dyestuffs such, for example as Melantherine BH (Schultz Farbstofftabellen No. 393)
Direct Yellow T (Colour Index No. 620, Schultz Farbstofftabellen No. 703)
Trisulfone Brown B (Colour Index No. 561, Schultz Farbstofftalbellen No. 696)
Citronine OOO (Colour Index No. 145, Schultz Farbstofftabellen No. 180)
Orange R (Colour Index No. 161, Schultz Farbstofftabellen No. 198)
Rocceline (Colour Index No. 176, Schultz Farbstofftabellen No. 206)
Direct Blue 3 B (Colour Index No. 477, Schultz Farbstofftabellen No. 471)

The green-dyeing chromium compound of the monoazodyestuff from diazotized 1-hydroxy-2-amino-5-nitrobenzene and 2-amino-naphthalene-6-sulfonic acid.

The following examples illustrate the invention, the parts being by weight unless otherwise stated and the relationship of parts by weight to parts by volume being the same as that of the kilogram to the liter.

*Example 1*

Chrome-tanned leather is treated without previous drying with three times its weight of water, which contains 2% of a sufonated oil and 0.5% of the condensation product described below (calculated on the weight of the pared leather), at 50° C. for ¾ of an hour in a vat. The leather is then dried and prepared for dyeing.

The leather is dyed by brushing with a dyestuff solution containing, per liter, 3.7 grams of Chrome Leather Yellow T (Colour Index No. 620) and 5 grams of formic acid.

A uniform full dyeing is obtained. The absorption capacity of the leather corresponds approximately to that of a vegetable tanned leather.

The condensation product used above is made as follows:

207 parts of ethylene oxide are introduced into 150 parts of hydrogenated abietylamine at 160–170° C. in the presence of 0.1 part of finely divided metallic sodium in the course of about 5 hours. The reaction product is a rather thick oil which dissolves to a clear solution in water.

The hydrogenated abietylamine used for the reaction has the following properties: Boils at 187–211° C. under 5 mm. pressure, viscosity 4670 centistokes at 25° C., density 0.997 at 25° C.; nitrogen content=4.2–4.5%, and neutralization equivalent=317.

A resin amine having these properties is obtainable in commerce under the name "Rosinamine D."

*Example 2*

In the manner described in Example 1 suede leather is pre-treated for dyeing. The leather, for example, after being shaved and neutralized, is fatted in the usual manner with 2% of turkey red oil. After 15 minutes 0.5% of the condensation product described in Example 1 is added, and the leather is further treated for ½ an hour at 50° C. The percentages are calculated on the shaving weight of the leather. The leather is then prepared in the usual manner for dyeing by drumming or wetting back the dried suede leather with warm water with the addition of 2% of ammonia, after the leather has been staked, tacked on board and wheeled.

The dyeing is carried out in the dye liquor at a goods to liquor ratio of 1:10 at 50–60° C. 2% of ammonia and 2.6% of Melantherine BH (Schultz Farbstofftabellen No. 393) are added to the liquor. Dyeing is carried on for 1½ hours. Then the dyestuff is fixed for ½ an hour with the addition of 5% of formic acid. The leather pre-treated with the condensation product can be rapidly wetted back and a full dyeing can be produced.

*Example 3*

The procedure is the same as that described in Example 1 or 2, except that instead of the condensation product used in these examples, there is used a condensation product of oleylamine and ethylene oxide which is prepared as follows:

100 parts of commercial oleylamine are mixed with 1 part of finely divided sodium and heated up to 140° C., and then ethylene oxide is introduced at 135°–140° C. As soon as the ethylene oxide is taken up rapidly, the reaction temperature is lowered to 120–125° C., and the introduction of ethylene oxide is continued until 113 parts thereof have been taken up. The reaction product so obtained is soluble in water to give a practically clear solution.

*Example 4*

Dry chrome-tanned leather is drummed in a vat at 40° C. with a solution of the condensation product described below until wetting is complete. The goods to liquor ratio is 1:10. The solution contains 2% of the condensation product calculated on the dry leather.

The subsequent dyeing may be carried out in the usual manner, for example, as described in Examples 1 or 2.

Instead of the free amine, a salt derived therefrom may be used.

The condensation product referred to above may be prepared as follows:

An alkyl-benzene, which is available in commerce under the name "Neolen 400" or "Oronite Alkane," is nitrated in the benzene nucleus in the usual manner, and the nitro group is converted into an amino group by reduction with iron and acid.

146 parts of ethylene oxide are introduced in the course of a few hours into 92 parts of the resulting amine at about 140° C. with the addition of 0.25 part of finely divided sodium. In the cold the reaction product is a semi-solid pale brown mass, which is soluble in water.

*Example 5*

Fat-liquored dry chrome leather is brushed three to four times with a dyestuff solution containing per liter 3 grams of the condensation product from hydrogenated abietylamine and ethylene oxide, according to Example 1
11 grams of Chrome Leather Yellow T (Colour Index No. 620)
15 grams of concentrated formic acid, then rinsed and dried.
A full level dyeing is obtained.

*Example 6*

Without prior drumming suede leather is dyed in a vat for one hour to ensure complete penetration of the dye. The dyebath contains 4% of ammonia,
0.5% of the condensation product from hydrogenated abietylamine and ethylene oxide described in Example 1,
4.4% of Chrome Leather Yellow T (Colour Index No. 620)
600% of water, calculated on the weight of the air-dried leather. The dyeing is then fixed by addition of 8% of formic acid in two portions within half an hour. A level dyeing is obtained.

Instead of the condensation product used in this example an equivalent quantity of a condensation product from 77 parts of ethylene oxide and 30 parts of triethanolamine-coconut fatty acid-ester can be used.

What we claim is:

1. A process for dyeing leather with a dyestuff selected from the group consisting of acid dyes and direct dyes, which leather has been tanned with a chromium salt in conjunction with another tanning agent free from phenolic hydroxyl groups, which comprises treating the leather at the latest during dyeing with a condensation product which in its free base state corresponds to the formula

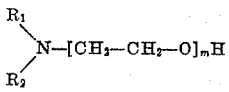

wherein $R_1$ is a high molecular hydrocarbon radical selected from the group consisting of high molecular aliphatic hydrocarbon and high molecular alicyclic hydrocarbon radicals, and $R_2$ is a member selected from the group consisting of hydrogen, lower alkyl and residues of the formula

$m$ and $n$ being whole numbers, the sum $(m+n)$ having a value of at least 4.

2. A process for dyeing leather with a dyestuff selected from the group consisting of acid dyes and direct dyes, which leather has been tanned with a chromium salt, which comprises treating the leather at the latest during dyeing with a condensation product which in its free base state corresponds to the formula

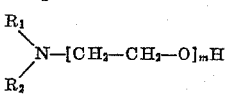

wherein $R_1$ is a high molecular hydrocarbon radical selected from the group consisting of high molecular aliphatic hydrocarbon and high molecular alicyclic hydrocarbon radicals, and $R_2$ is a member selected from the group consisting of hydrogen, lower alkyl and residues of the formula

$m$ and $n$ being whole numbers, the sum $(m+n)$ having a value of at least 4.

3. A process for dyeing leather with a dyestuff selected from the group consisting of acid dyes and direct dyes, which leather has been tanned with a chromium salt, which comprises treating the leather before dyeing with a condensation product which in its free base state corresponds to the formula

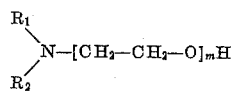

wherein $R_1$ is a high molecular hydrocarbon radical selected from the group consisting of high molecular aliphatic hydrocarbon and high molecular alicyclic hydrocarbon radicals, and $R_2$ is a member selected from the group consisting of hydrogen, lower alkyl and residues of the formula

$m$ and $n$ being whole numbers, the sum $(m+n)$ having a value of at least 4, and then dyeing the thus-treated leather.

4. A process for dyeing leather with an acid dye, which leather has been tanned with a chromium salt, which comprises treating the leather before dyeing with a condensation product which in its free base state corresponds to the formula

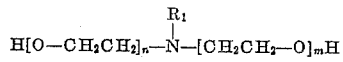

wherein $R_1$ is the oleyl radical, $m$ and $n$ being whole numbers, the sum $(m+n)$ having a value of 6, and then dyeing the thus-treated leather.

5. A process for dyeing leather with an acid dye, which leather has been tanned with a chromium salt, which comprises treating the leather during dyeing with a condensation product which in its free base state corresponds to the formula

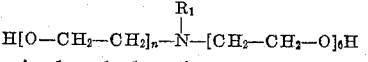

wherein $R_1$ is the oleyl radical, $m$ and $n$ being whole numbers, the sum $(m+n)$ having a value of 6.

6. A process for dyeing leather with an acid dye, which leather has been tanned with a chromium salt, which comprises dyeing the leather and treating the same at the latest during such dyeing with a reaction product which in its free base state corresponds to the formula

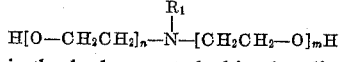

wherein $R_1$ is the hydrogenated abietyl radical, $m$ and $n$ being whole numbers, the sum $(m+n)$ having a value of at least 4.

7. A process for dyeing leather with an acid dye, which leather has been tanned with a chromium salt, which comprises treating the leather before dyeing with a condensation product which in its free base state corresponds to the formula

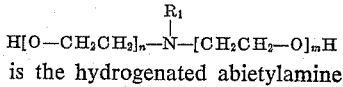

wherein $R_1$ is the hydrogenated abietylamine radical, $m$ and $n$ being whole numbers, the sum $(m+n)$ having a value of 10, and then dyeing the thus-treated leather.

References Cited in the file of this patent

UNITED STATES PATENTS

| | | |
|---|---|---|
| 1,923,178 | Ulrich | Aug. 22, 1933 |
| 2,044,099 | Piggott | June 16, 1936 |
| 2,185,427 | Brodersen | Jan. 2, 1940 |
| 2,228,369 | Schoeller | Jan. 14, 1941 |

FOREIGN PATENTS

| | | |
|---|---|---|
| 380,851 | Great Britain | Sept. 12, 1932 |